(12) United States Patent
Arms et al.

(10) Patent No.: US 7,332,210 B2
(45) Date of Patent: Feb. 19, 2008

(54) GRADIENT DOT PATTERN FOR REDUCING VISIBLE STEP LINES ON THE FACE OF AN APPLIQUE

(75) Inventors: Christopher A Arms, Southfield, MI (US); Joel Stooksbury, Southfield, MI (US)

(73) Assignees: Denso International America Inc., Southfield, MI (US); Denso Manufacturing Tennessee, Inc., Maryville, TN (US)

( * ) Notice: Subject to any disclaimer, the term of this patent is extended or adjusted under 35 U.S.C. 154(b) by 487 days.

(21) Appl. No.: 10/800,087

(22) Filed: Mar. 12, 2004

(65) Prior Publication Data

US 2005/0202218 A1    Sep. 15, 2005

(51) Int. Cl.
*B41M 5/00* (2006.01)

(52) U.S. Cl. .................. 428/195.1; 358/1.8; 362/29; 362/30; 362/351; 362/23; 430/9; 430/31; 430/114.1; 430/15; 428/411.1; 428/212; 101/115; 101/129

(58) Field of Classification Search .................. 362/23, 362/29, 30, 351; 428/411.1, 195.1, 212; 430/9, 31, 114.1, 15; 101/115, 129
See application file for complete search history.

(56) References Cited

U.S. PATENT DOCUMENTS 5,247,429 A * 9/1993 Iwase et al. .................. 362/29
5,266,427 A * 11/1993 Iwase et al. .................. 430/15
6,210,776 B1 * 4/2001 Hill .............................. 428/187
6,251,505 B1 * 6/2001 Rakos et al. ................. 428/212
6,663,252 B1 * 12/2003 Fong et al. .................... 362/29
2002/0001183 A1 * 1/2002 Shigehiro ..................... 362/23

FOREIGN PATENT DOCUMENTS

| JP | 2526323 | 11/1996 |
| JP | 2003-223124 | 8/2003 |

* cited by examiner

*Primary Examiner*—Rena Dye
*Assistant Examiner*—Tamra L. Dicus
(74) *Attorney, Agent, or Firm*—Harness, Dickey & Pierce, PLC

(57) ABSTRACT

Various manufacturing techniques may be employed to construct an appliqué for use in an instrument cluster. In one commonly employed technique, an appliqué may be formed by applying different colored ink layers onto a surface of a polycarbonate sheet using a silk screen printing. In some instance, an edge of an underlying ink layer may cause a visible step line on the face of the appliqué. To reduce or eliminate these visible step lines, an outer boundary area of the printing layers invention are defined as a dispersing dot pattern.

12 Claims, 5 Drawing Sheets

GRADIENT DOT PATTERN FOR REDUCING
VISIBLE STEP LINES ON THE FACE OF AN
APPLIQUE

FIELD OF THE INVENTION

The present invention relates generally to vehicle instrument clusters and, more particularly, to a technique for reducing visible step lines on the face of an appliqué for an instrument cluster.

BACKGROUND OF THE INVENTION

Various manufacturing techniques may be employed to construct an appliqué for use in an instrument cluster. In one commonly employed technique, an appliqué may be formed by applying different colored ink layers onto a surface of a polycarbonate sheet using a well known silk screen printing process. The different colored ink layers are typically applied to different areas along the surface of the polycarbonate sheet. These different colored ink layers are then covered by a layer of black colored ink which serves as the visible face of the appliqué. The outer most black colored ink layer is selectively applied onto the surface, thereby forming visible red graphics on the face of the appliqué. In some instance, an edge of an underlying ink layer may cause a visible step line on the face of the appliqué as shown in FIG. 5A. The appliqué may undergo some additional deformation process which may further cause a visible step line on the face of the applique as shown in FIG. 5B. Therefore, it is desirable to provide a technique for reducing or eliminating visible step lines on the face of an appliqué for an instrument cluster.

SUMMARY OF THE INVENTION

Rather than employing underlying printing layers which have sharp edges, the printing layers of the present invention include an outer boundary area defined as a dispersing dot pattern, thereby enabling a smoother transition in height amongst the different printing layers and reducing or eliminating any visible step lines on the face of the appliqué.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
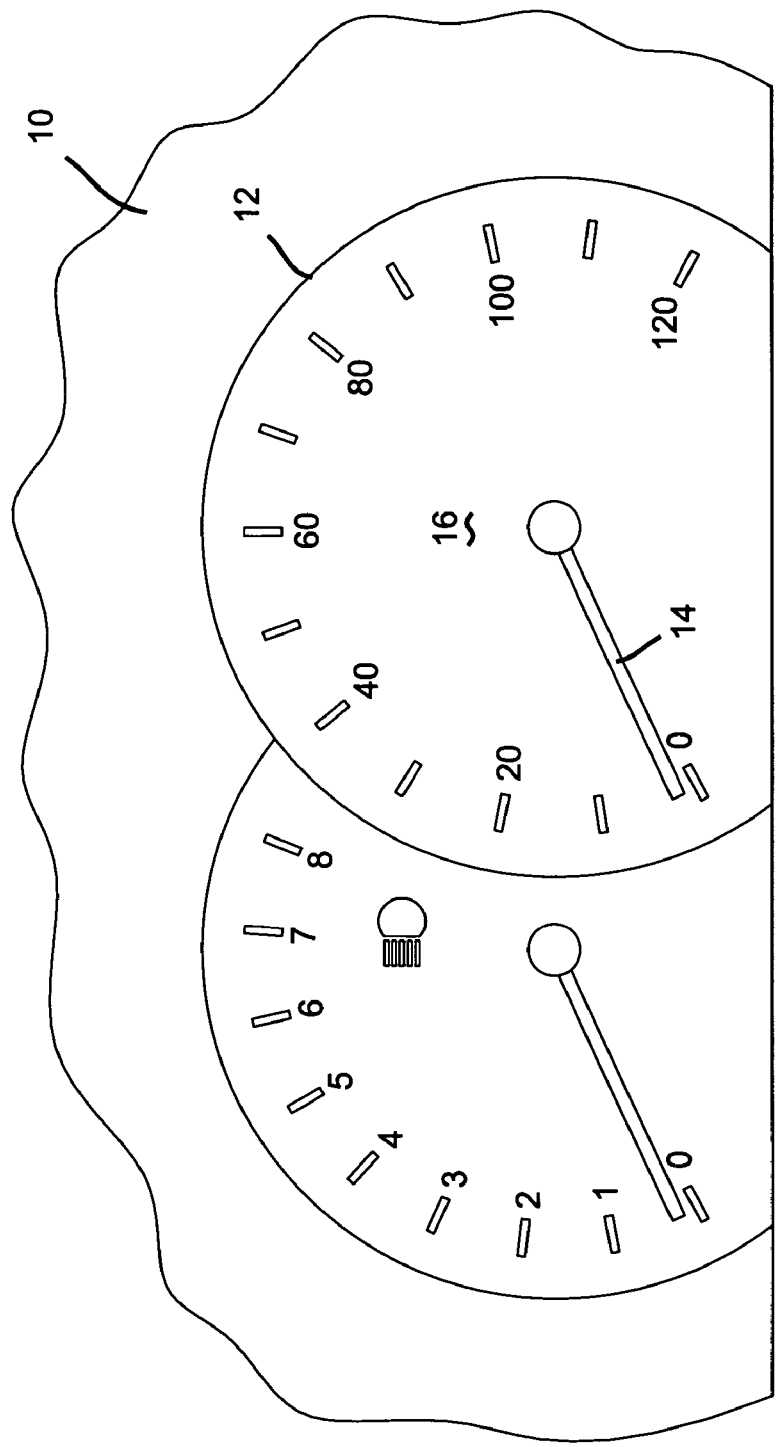
FIG. 1 illustrates a front side of an exemplary instrument cluster for use in an automotive vehicle.

FIG. 1 depicts an exemplary instrument cluster 10 in an automotive vehicle. The instrument cluster 10 may include various gauges and dials which are to viewed and/or operated by an occupant of the vehicle. For example, a speedometer 12 may be used to display the speed which a vehicle is traveling. The speedometer includes a movable pointer 14 which correlates to the speed of the vehicle. To provide meaningful graphical information to the occupant, an appliqué 16 forms the background for the pointer 14 of the speedometer. In this example, the appliqué for the speedometer provides a scale of numbers, such that the pointer is operable to point to the applicable number which corresponds to the speed of the vehicle.

Referring to FIGS. 2-4, a method for constructing a viewed component, such as an appliqué for an instrument cluster, is further described in accordance with the present invention. While the following description is provided with reference to an appliqué for use in an instrument cluster, it is readily understood that the broader aspects of the present invention are applicable to any viewed component whose visible face may include a visible step line caused by an underlying layer.

A viewed component is constructed from a planar sheet 22 of suitable material. The planar sheet 22 is initially die cut or otherwise sized into a desired shape. Thus, the properly sized planar sheet serves as a substrate for the remainder of the construction process. Although the planar sheet is preferably comprised of a polycarbonate material, it is readily understood that other materials are within the scope of the present invention.

Figure 2A:
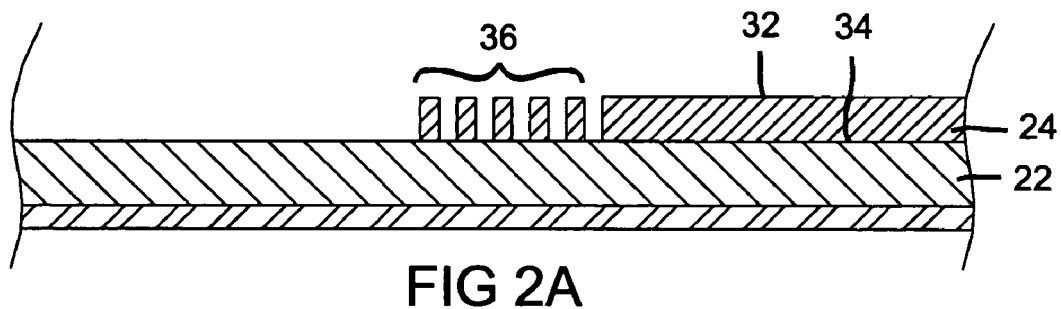
FIGS. 2A and 2B are fragmentary, cross-sectional side views depicting the formation of an appliqué in accordance with the present invention.

Graphical indicators may be formed by applying different colored ink layers onto the surfaces of the planar sheet. To form the red numbers found on the face of a speedometer, for example, a red colored ink layer 24 is printed on a front side surface of the planar sheet 22 as shown in FIG. 2A. The different colored ink layers may be applied to the planar sheet using a silk screen printing process or other various known manufacturing techniques. Since different colored graphics may appear on the appliqué, the red colored ink layer 24 is only applied to a portion of the planar sheet 22. Thus, the red colored ink layer 24 defines a top surface 32, a bottom surface 34 and an outer boundary area 36, such that the bottom surface 34 faces the planar sheet 22.

Rather than forming the outer boundary area 36 as a sharp edge, the outer boundary area 36 is formed as a dispersing dot pattern. The dot pattern includes a plurality of spatially separated dots, where the spatial separation between dots gradually increases along a direction outwardly from the outer boundary of the layer. In an exemplary embodiment, each dot in the pattern has a cylindrical shape, such that the radial dimension for the dots gradually decreases in a direction outwardly from the outer boundary. Although dots having a cylindrical shape are described herein, it is readily understood that other geometric shapes are also within the scope of the present invention.

Figure 2B:
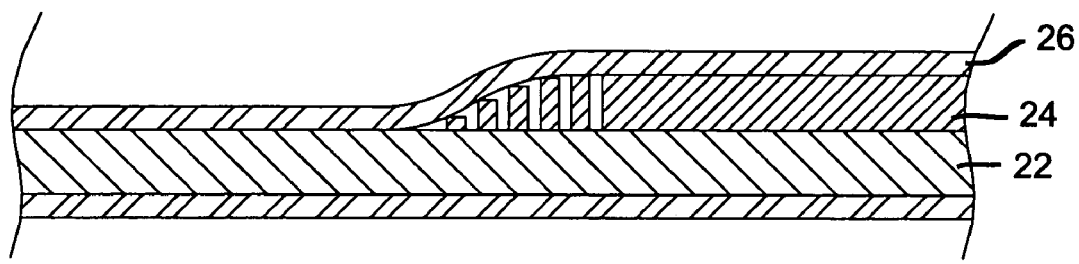

Referring to FIG. 2B, the red colored ink layer 24 is then covered by a black colored ink layer 26 that serves as the visible face of the appliqué. To form the desired graphical symbols, the black colored ink layer 26 is selectively printed onto the planar sheet, thereby exposing portions of the underlying red colored ink layer 24. As noted above, the black colored ink 26 may be selectively applied to the planar sheet using a silk screen printing process or another known manufacturing technique. It is readily understood that other underlying colored layers may also be printed onto the planar sheet prior to the application of black colored ink layer 26.

In accordance with the present invention, the dispersing dot pattern formed along the outer boundary layer of each underlying printed layer enables a smoother height transition amongst the different printed layers. During application of the black colored ink layer 26 over top of the red colored ink layer 24, a downward force reduces the height of at least some of the dots along the outer boundary area of the red colored ink layer. Specifically, dots disposed further away from the outer edge are reduced in height more than those closer to the outer edge of the red colored ink layer. As a result, the outer boundary area exhibits a profile which slopes gradually downward from the top surface towards the planar sheet, thereby reducing or eliminating the visible appearance of a pronounced step line along the outer edge of the underlying printed layer.

Figure 3B:
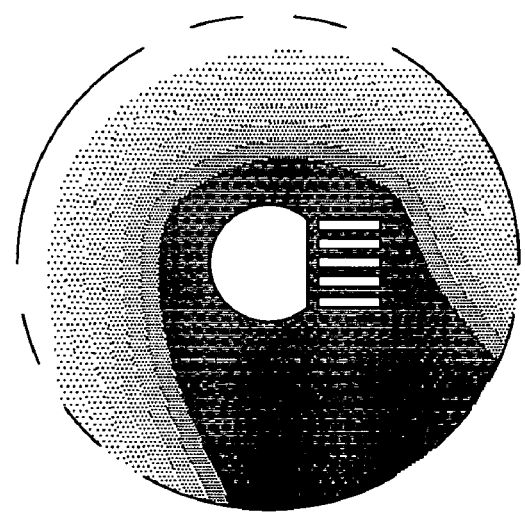
FIGS. 3A and 3B illustrates a backside view of the exemplary instrument cluster in accordance with the present invention.
Figure 3A:
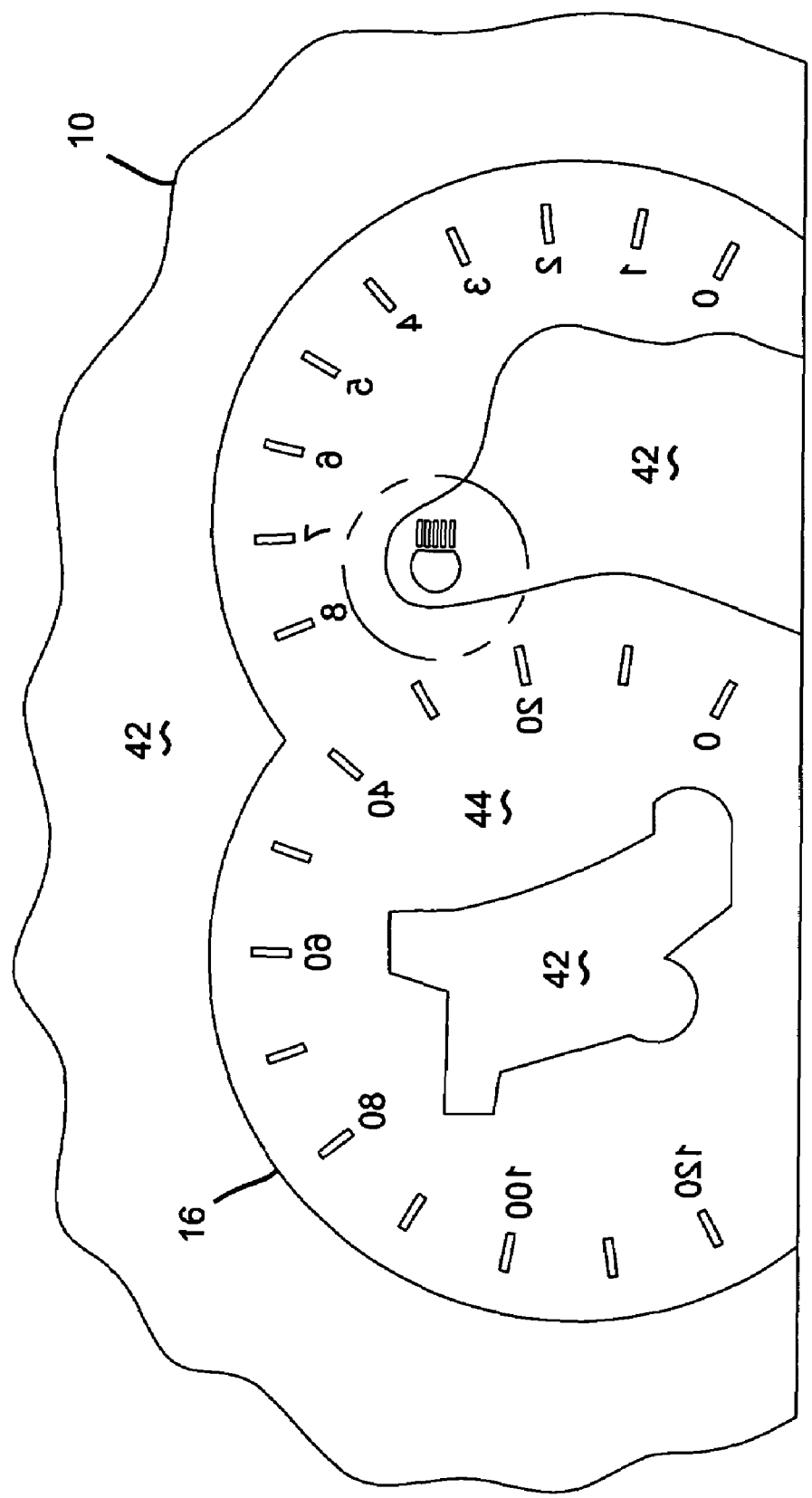
Figure 4A:
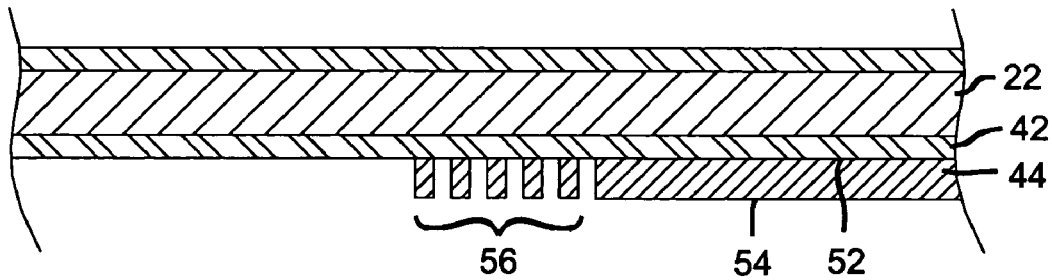
FIGS. 4A and 4B are fragmentary, cross sectional side views depicting the formation of an appliqué in accordance with the present invention.

Furthermore, the viewed component may be backlit to facilitate viewing of the component during dark conditions. In these instances, the viewed component may include additional layers formed on the backside of the planar sheet. Referring to FIGS. 3A and 4A, a black colored ink layer 42 may be printed onto the entire backside surface of the planar sheet 22. A white colored ink layer 44 is then printed over top of the black colored ink layer 42 in select areas. The white colored ink layer 44 defines an inner surface 52, an outer surface 54 and an outer boundary area 56, such that the inner surface faces the planar sheet 22. In this way, the white bottom layer improves backlighting as is well known in the art. However, the viewed component may undergo a further deformation process that can cause the formation of a visible step line. Exemplary deformation processes include (but not limited to) a high pressure forming process, a vacuum forming process or a hydroforming process.

To reduce or eliminate a visible step line, the outer boundary area 56 of the outer white layer 44 is likewise formed as a dispersing dot pattern. As described above, the dot pattern includes a plurality of spatially separated dots, where the spatial separation between dots gradually increases along a direction outwardly from the outer boundary of the layer as best seen in FIG. 3B. Although not limited thereto, each dot in the pattern is of a cylindrical shape, such that the radial dimension for the dots gradually decreases in a direction outwardly from the outer boundary.

Figure 4B:
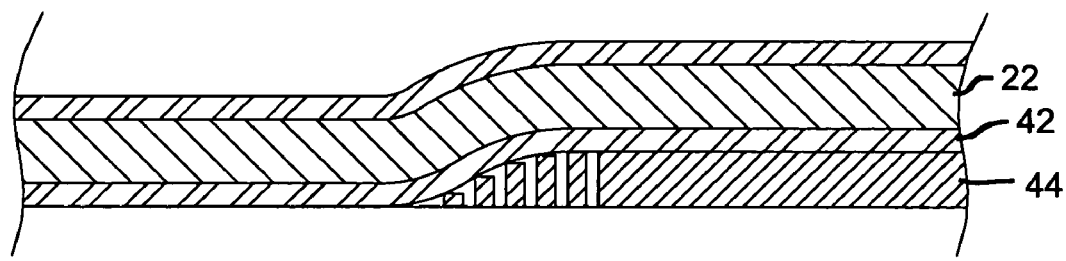
Figure 5A:
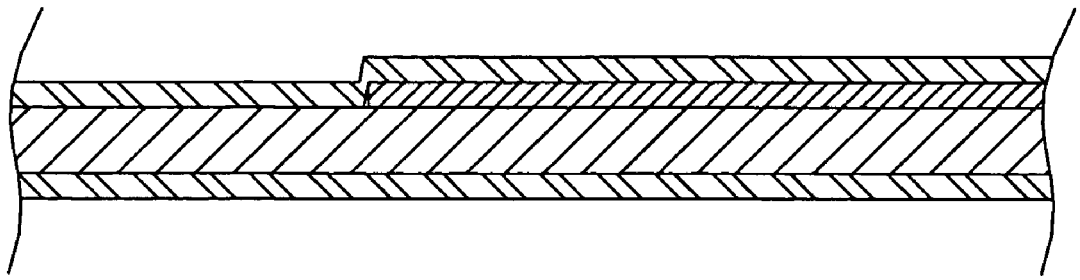
FIGS. 5A and 5B are fragmentary, cross-sectional side views of appliqués constructed using conventional manufacturing techniques.
Figure 5B:
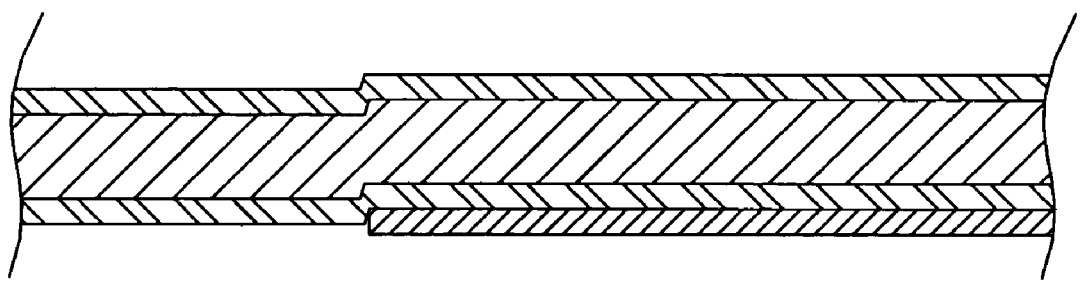

During the deformation process, the dispersed dot pattern along the outer boundary of the white colored layer 44 enables a smoother height transition amongst the different printed layers. Referring to FIG. 4B, the height of at least some of the dots are reduced as pressure is applied to the viewed component. Again, dots disposed further away from the outer edge are reduced in height more than those closer to the outer edge of the red colored ink layer. Thus, the outer boundary area exhibits a sloped profile, thereby reducing or eliminating the visible appearance of a pronounced step line along the visible face of the applique.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A viewed component of a vehicle instrument cluster, comprising:
   a planar sheet;
   an underlying layer printed on a surface of the planar sheet, the underlying layer having an outer surface, an inner surface and an outer boundary area, such that the inner surface faces the planar sheet and the outer boundary area is formed as a dispersing dot pattern; and
   an outer layer printed onto the surface of the planar sheet, wherein at least a portion of the outer layer overlays the underlying layer, wherein the dot pattern includes a plurality of spatially separated dots such that along a direction outwardly from the outer boundary area of the first layer, spatial separation between the dots gradually increases and heights of the dots of the dot pattern gradually decrease and cause a sloped outer layer.

2. The viewed component of claim 1 wherein the dot pattern includes a plurality of spatially separated dots having a cylindrical shape, such that a radial dimension for the dots gradually decreases in a direction outwardly from the outer boundary area of the first layer.

3. The viewed component of claim 1 wherein the outer layer having an inner surface facing the outer surface of the underlying layer and an outer surface serving as a visible face of the viewed component.

4. The viewed component of claim 3 further comprises an intermediate layer interposed between the planar sheet and the underlying layer and having an outer boundary that extends outside the outer boundary area of the underlying layer.

5. The viewed component of claim 1 wherein the planar sheet is comprised of a polycarbonate material.

6. The viewed component of claim 1 wherein the underlying layer is further defined as a colored ink applied to the planar sheet by a silk screen printing process.

7. A viewed component of an instrument cluster, comprising:
   a planar sheet as a substrate of the viewed component;
   a first layer located against a front side surface of the planar sheet, the first layer having a top surface, a bottom surface and an outer boundary area, wherein the bottom surface faces the planar sheet and the outer boundary area is formed as a dot pattern, wherein the dot pattern has a spatial separation that gradually increases, while heights of dots of the dot pattern gradually decrease, outwardly from the outer boundary area of the first layer; and
   a second layer located against the surface of the planar sheet, wherein at least a portion of the second layer overlays and smoothly conforms to a transition between the planar sheet and a contour of the first layer, thereby forming the viewed component.

8. The viewed component of claim 7 wherein the second layer having an inner surface facing the top surface of the first layer and an outer surface serving as a visible face of the viewed component.

9. The viewed component of claim 7 wherein the dot pattern includes a plurality of spatially separated dots having a cylindrical shape, such that a radial dimension of the dots decreases in a direction outwardly from the outer boundary area of the first layer.

10. The viewed component of claim 7 wherein:
    the first layer is a first uniform thickness; and
    the second layer is a second non-uniform thickness.

11. The viewed component of claim 8 wherein the second layer follows a profile of the outer boundary area.

12. The viewed component of claim 11 wherein the second layer slopes gradually towards the planar sheet in a direction of increasing distance between dots of the dot pattern.

* * * * *